Figure 1:
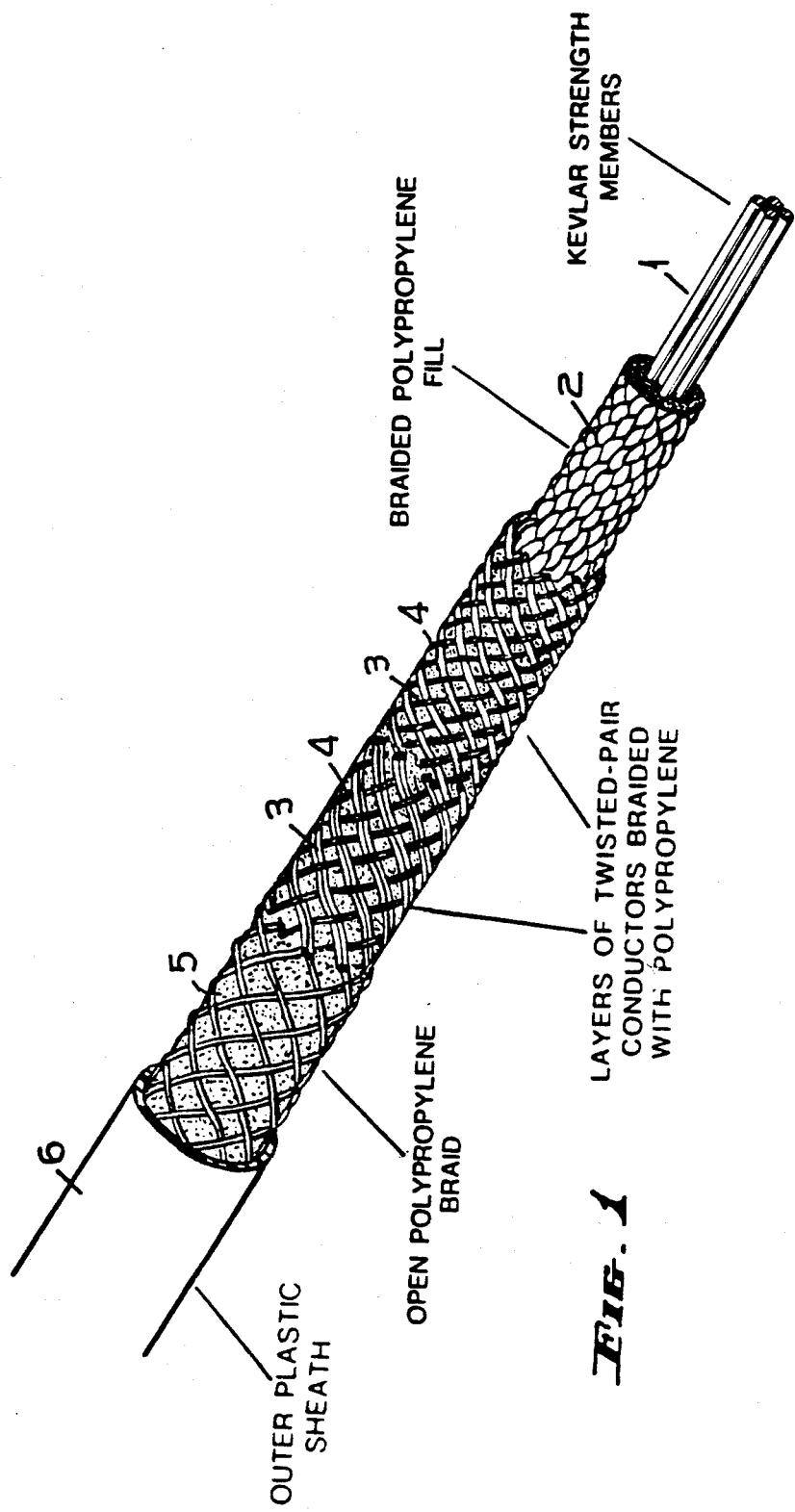

United States Patent [19]

Carpenter

[11] Patent Number: 4,491,939
[45] Date of Patent: Jan. 1, 1985

[54] HYDROPHONE CABLE

[75] Inventor: Allan L. Carpenter, Surrey Downs, Australia

[73] Assignee: The Commonwealth of Australia, Canberra, Australia

[21] Appl. No.: 486,956

[22] PCT Filed: Aug. 10, 1982

[86] PCT No.: PCT/AU82/00127
§ 371 Date: Apr. 8, 1983
§ 102(e) Date: Apr. 8, 1983

[87] PCT Pub. No.: WO83/00564
PCT Pub. Date: Feb. 17, 1983

[30] Foreign Application Priority Data

Aug. 13, 1981 [AU] Australia ............................. PF0210

[51] Int. Cl.³ .............................................. G01V 1/38
[52] U.S. Cl. ..................................... 367/20; 367/154; 367/166; 174/101.5; 174/108
[58] Field of Search ................. 367/154, 20, 173, 166; 174/101.5, 108

[56] References Cited

U.S. PATENT DOCUMENTS

| | | | |
|---|---|---|---|
| 3,659,256 | 4/1972 | Hudson et al. | 367/18 |
| 4,160,229 | 7/1979 | McGough | 367/154 |
| 4,241,427 | 12/1980 | Swenson | 367/20 |
| 4,353,120 | 10/1982 | Pickens | 367/142 |

Primary Examiner—Maynard R. Wilbur
Assistant Examiner—Ian Lobo
Attorney, Agent, or Firm—Cushman, Darby & Cushman

[57] ABSTRACT

A hydrophone cable having a series of hydrophones (7) at spaced intervals along the cable and having strength members (1) and transmission line conductors (3) extending along the cable in which a braided construction (2, 3, 4 and 5) is used which can be loosened to insert the hydrophones (7) into cable, voids in the cable being filled with a buoyant gel and the assembly covered by an outer plastic sheet (6).

8 Claims, 6 Drawing Figures

HYDROPHONE CABLE

This invention relates to a hydrophone cable and in particular it relates to certain improvements to cables of this type which are towed in the ocean and which are arranged as acoustic arrays comprising a series of hydrophones spaced at required intervals and carried in a buoyancy device to allow towing from a vessel at a required depth below the surface of the ocean.

Such devices are used for seismic exploration and for ship and submarine detection and similar purposes and operate on the basis that the hydrophones are coupled either singly or in groups to instrumentation on board the vessel to act as sonar detectors.

The arrangement of these devices as known at present is such that neutral buoyancy is achieved and according to forms of the device at present in use the hydrophones are spaced along a towing cable with which are also associated the transmission lines which transmit the signals from the hydrophone to the vessel. The transmission lines (for data and power), hydrophones and other components (preamplifiers, other sensors, spacers etc.) are contained in tubular pliable devices (casings or sleeves) which are filled with a buoyant fluid such as kerosene so that neutral buoyancy is achieved of the complete assembly. The configuration is such that the required sensitivity of the hydrophones is not lost because of their enclosure in the casing, the buoyant fluid fill having the required acoustic properties to transmit the sound pressure waves from the casing wall to the hydrophone elements.

Typical Prior Art Specifications are; U.S. Pat. No. 3,480,907 J. D. King which shows a hydrophone cable having hydrophones along its length at spaced intervals and including a jacket with tensile members along the inside of the outer sheath and teaching generally the art of neutral buoyancy, also U.S. Pat. No. 3,696,329 G. D. Hazelhurst, U.S. Pat. No. 3,518,677 E. F. Florian, U.S. Pat. No. 3,434,104 F. E. Stapleton et al, U.S. Pat. No. 3,319,734 G. M. Pavey, JR., U.S. Pat. No. 3,371,311 J. Colet et al, U.S. Pat. No. 3,531,760 W. A. Whitfill, JR., U.S. Pat. No. 3,744,016 B. W. Davis, U.S. Pat. No. 3,978,446 G. Kirby Miller, and Australian Pat. No. 457,052 Whitehall Electronics Corporation.

In the above hydrophone cables are shown having generally the characteristic of streaming cables which are generally of neutral buoyancy, but thecost of such devices is relatively high and intricate and handling is a problem because of the long lengths usually involved and the bulk of the units coupled with the need to be able to store the device on a vessel when not in use.

It is the object of this invention therefore to provide an improved form of acoustic array which will not have the intricacy of the previously used devices but which will be effective in picking up sounds and will be as free as possible of noise normally caused through turbulence of the water around the array during towing.

The device according to this invention consists of a cable-like structure constructed of polypropylene and-/or similar materials which together have the required buoyancy and tensile strength, and with which are incorporated the spaced hydrophones and the leads for transmitting the signal from the hydrophones along the array to the vessel, the cable of this invention being of braided construction such as by using a core of polypropylene or of the material known under the trade name of "KEVLAR" and to wind around this in helical form the transmission cables which can be wound in a matrix of the buoyant material, a sheath being extruded or otherwise placed over the whole assembly including the hydrophones which hydrophones can conveniently be of elongated form to fit into the cable, but the construction can be varied to have the high tensile members outwards of a core.

Because the structure can be built up of fibres forming cords wound into a particular pattern it will be realised that for instance a series of hydrophones can be spaced at required distances apart by untwisting the polypropylene core at the area where they are to be inserted so that uniform strength still exists over the complete length of the cable, additional winding then being applied in an appropriate manner which incorporates the electrical leads from the hydrophones to the vessel. Either single leads for each of the hydrophones or arrays of hydrophones can be included to give collective signals but, whatever the arrangement, it is possible to build up a cable which incorporates the hydrophones closely held in the buoyant material which, as said, being in the nature of cords which are interwound, allows a required configuration to be attained, including the transmission lines and, because the cable is built up in layers which can be successively applied around a basic core, the total cable can have a relatively uniform diameter over its length.

Such a cable thus comprises a hydrophone cable having a series of hydrophones at spaced intervals along the cable and having an outer sheath and within it strength members and transmission line conductors extending along the cable characterised by a braided construction such that the braided members can be loosened to insert the hydrophone assemblies, into the cable. The transmission line conductors and other members are generally braided with fibre strands so that when some strands are out at a hydrophone locality, at least the transmission line conductors can be twisted to open to allow insertion of the hydrophone assemblies.

Figure 2:
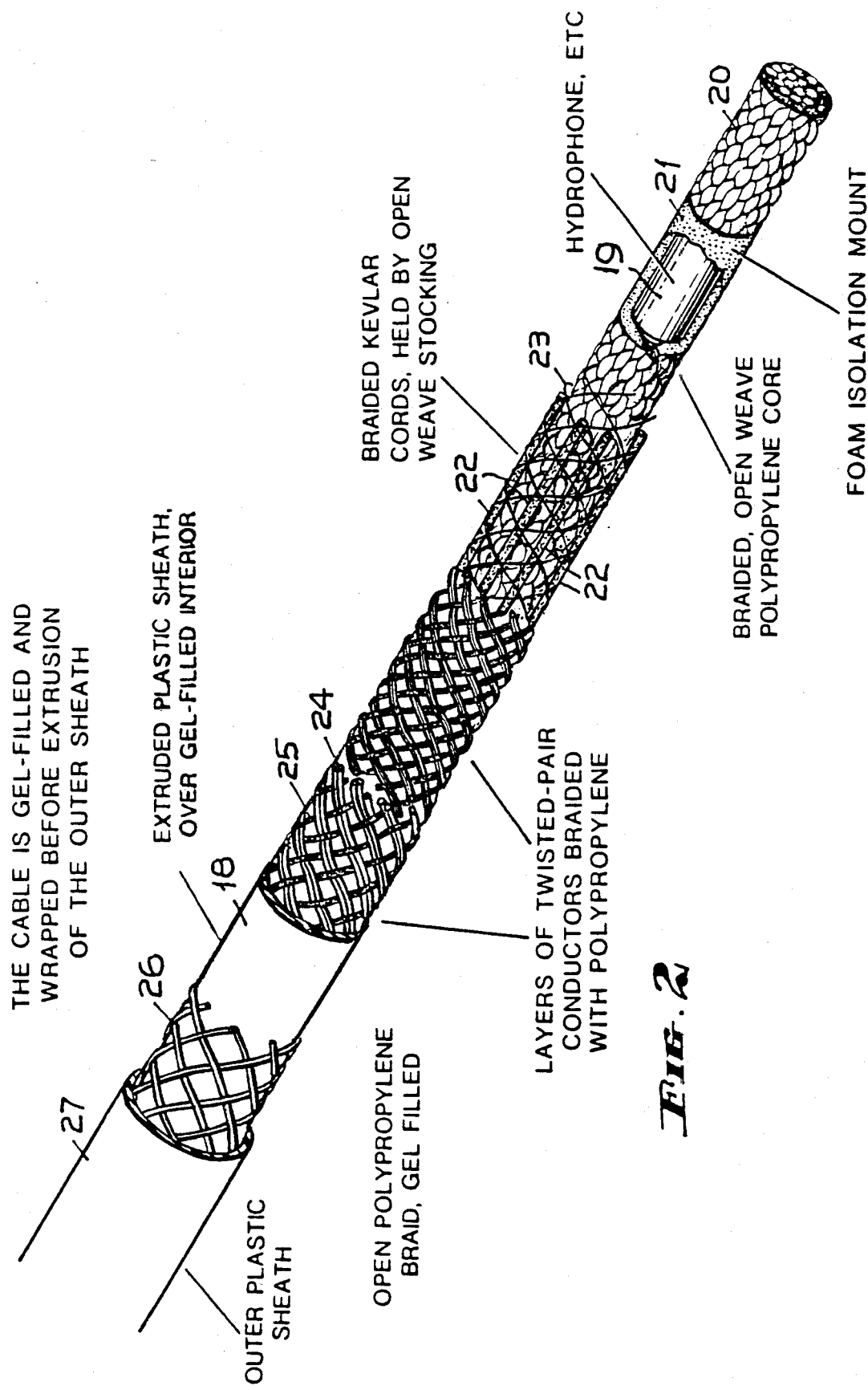
Figure 3:
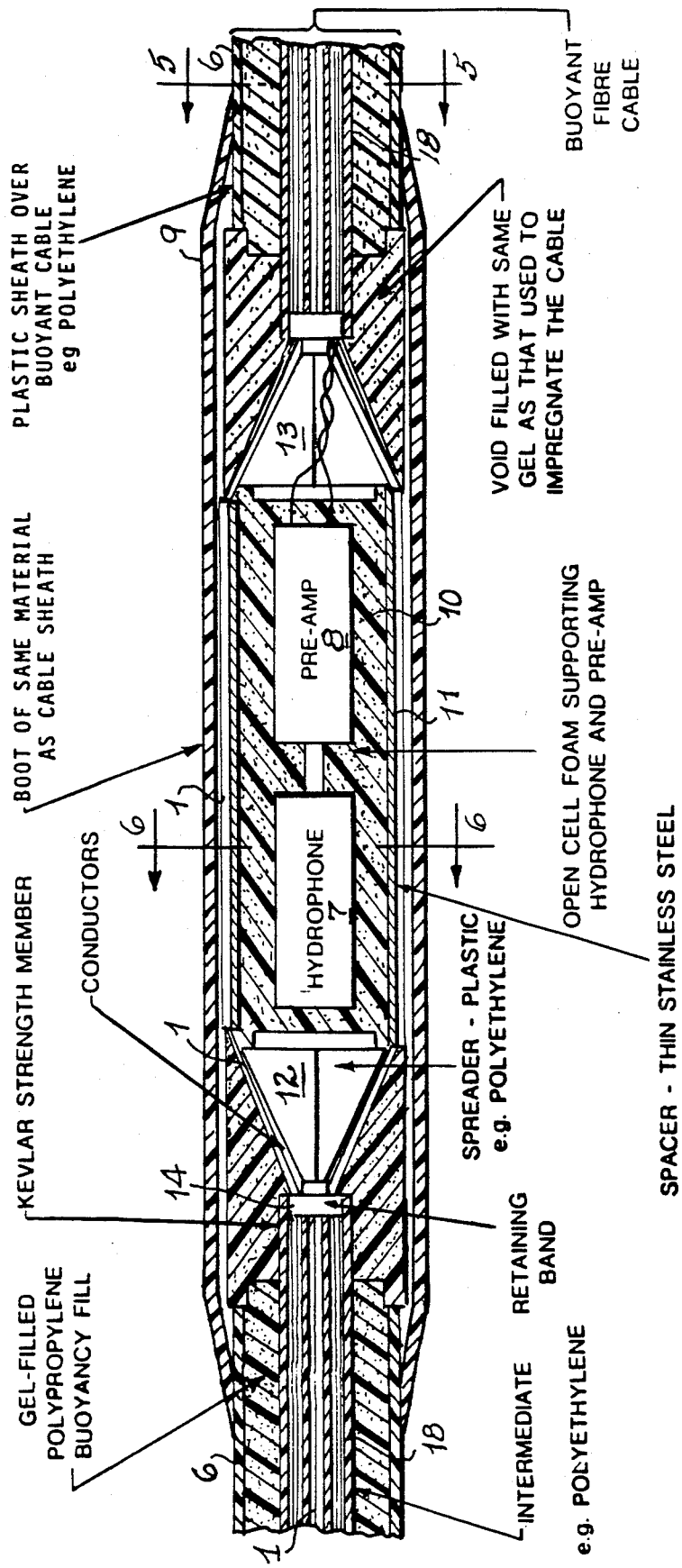
Figure 4:
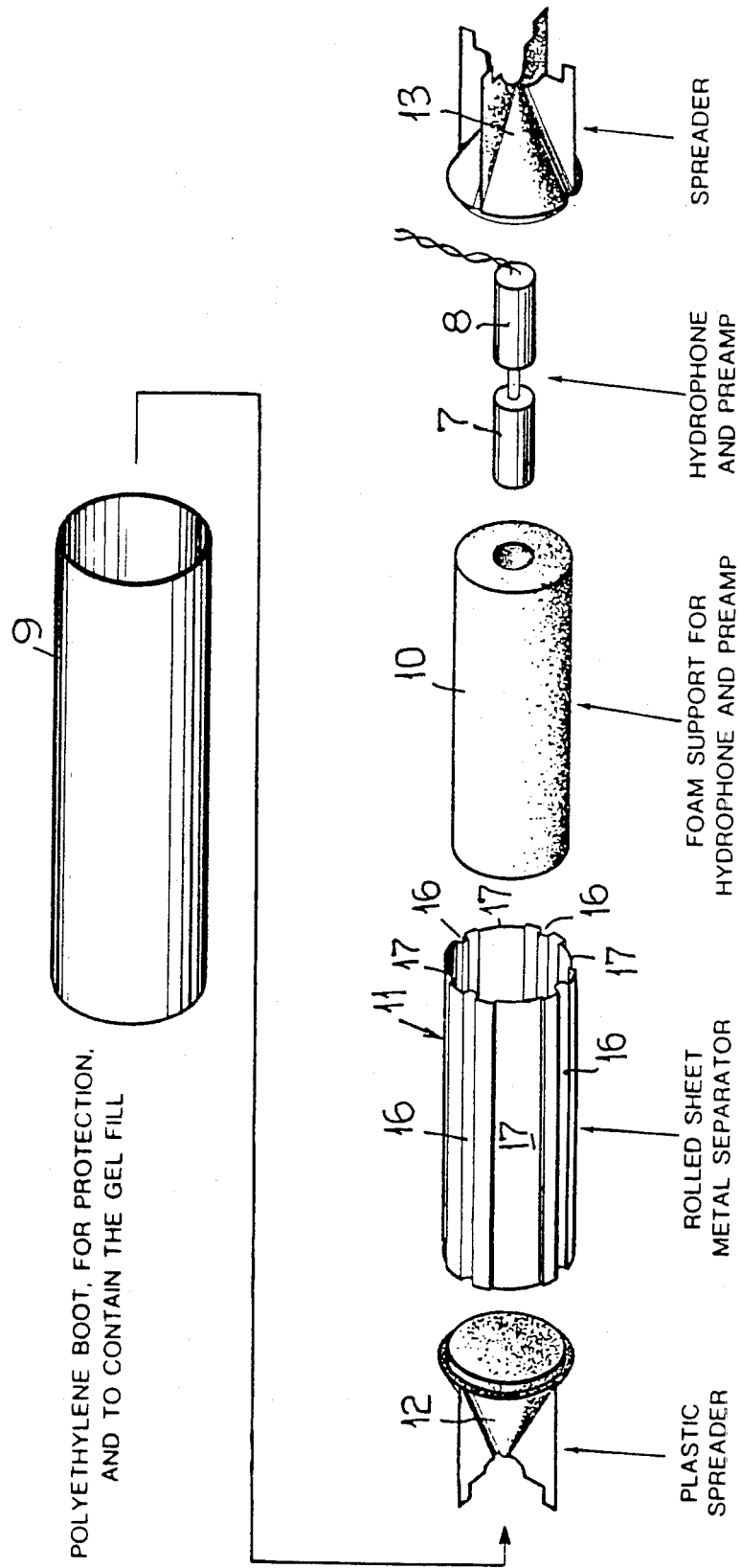
Figure 5:
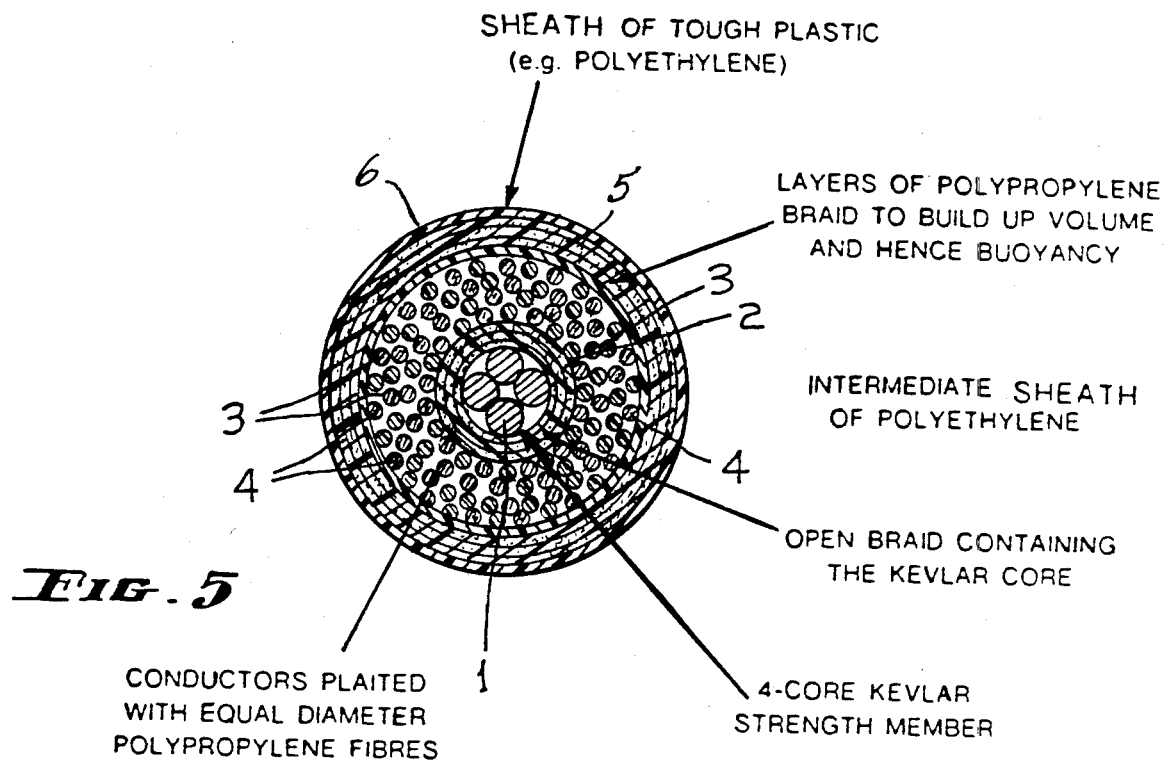
Figure 6:
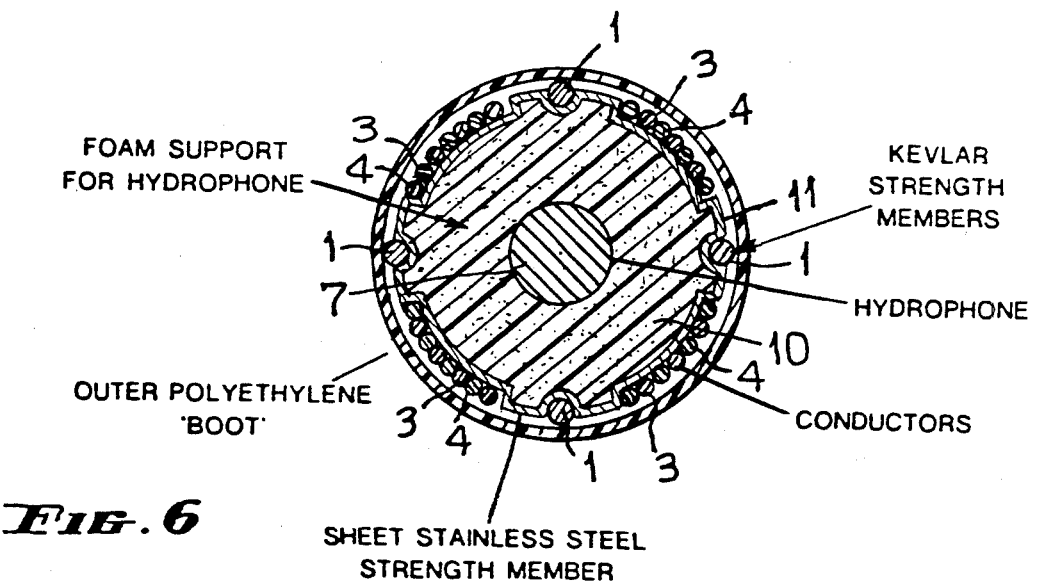

In order however that the invention will be more fully understood, embodiments thereof will now be described with reference to the accompanying drawings in which:

FIG. 1 is a perspective view of one form of cable, showing the cable progressively stripped to show the braided construction, FIG. 2 is a similar view of a modified form of cable, FIG. 3 is a longitudinal somewhat schematic section of a cable at the hydrophone locality showing how a spacer surrounding the hydrophone assembly allows the banding to extend around the hydrophone assembly area, FIG. 4 is an exploded view of the hydrophone assembly components, and FIGS. 5 and 6 are sectional views of the cable to a larger scale, FIG. 5 being taken on line 5—5 of FIG. 3 and FIG. 6 being taken on line 6—6 of FIG. 3.

In the form shown in FIG. 1 a series of "KEVLAR" strength members 1 have wound over them a braided polypropylene fill 2, over which in turn are wound layers of twisted-pair conductors 3 braided with polypropylene strands 4 to form a cellular layer, over which is then formed an open polypropylene braid 5.

The cable so formed is impregnated with a low specific gravity gel and paper wrapped (not shown) before an outer sheath 6 is extruded over it.

The hydrophones 7 and preamplifiers 8 are inserted into the braided structure by opening up the braid as shown particularly in FIG. 4 and if the hydrophone assemblies are inserted into the cable after the braiding of the cable is completed, a boot 9 is placed over the area to replace the sheath 6 where cut to give access to the braiding.

The reason why the braided structure can be opened up is that if the polypropylene strands are cut at the area of the insertion, the layers of twisted pair conductors can be twisted to unwind the conductors into a loose form where the hydrophone assemblies are to be positioned, after which the conductors can be held outside of the hydrophone assemblies as illustrated herein.

It will be noted that in this form the "KEVLAR" strength members 1 form the centre of the cable structure but are displaced outwardly around the hydrophone assemblies, the surrounding braided polypropylene covering being also capable of being spread by cutting the braid in one direction and twisting the uncut members to insert the hydrophone assemblies.

The hydrophone assemblies can take the form shown in FIGS. 3 and 4 from which it will be seen that the hydrophone 7 and preamplifiers 8 are inserted into an open-cell foam support 10 which in turn is inserted into a rolled sheet-metal separator 11 and the two ends of this are closed by a pair of plastic spreaders 12 and 13.

As seen in FIG. 3 the "KEVLAR" strength members and the braided strands are placed around the outside of the separator as seen particularly in FIG. 6 and held by retaining bands 14 and 15 at the two ends of the assembly. The separator is as shown in FIG. 6, provided with grooves 16 to locate the strength members 1 and with wider grooves 17 to house and locate the conductors 3 which elsewhere are plaited with the polypropylene fibres.

The outer sheath 6 is preferably formed of a tough plastic such as polyethylene.

The filler can be layers of polypropylene braid to build up volume and hence buoyancy.

If required, an intermediate plastic sheath 18 can be extruded over the conductors directly as shown in FIGS. 2, 3 and 5 to provide additional protection against abrasion and water ingress, the interior then being gel-filled prior to the extrusion of the said intermediate sheath.

In the form shown in FIG. 2 a braided open weave polypropylene core 20 have sections of foam isolation 21 inserted at appropriate areas of the core 20 in which the hydrophones 19 and preamplifiers (not shown) are inserted, and over this are positioned braided "KEVLAR" cord strength members 22 held in place by an overlay comprising an open weave braided stocking 23.

The layers of twisted pair conductors 24, braided with polypropylene strands 25, are placed over the stocking 23 and over this is a gel-filled open polypropylene braid 26. The cable is again gel-filled and wrapped before extrusion over it of the outer sheath 27.

In this form therefore, the "KEVLAR" strength members 22 are positioned around a core 20 instead of forming a core as in the form described with reference to FIG. 1, but again it is possible to open up the cable at the hydrophone localities by suitably cutting or distorting braid members running in one direction to allow the other members to be twisted to open a space sufficiently wide to allow insertion of the hydrophone assemblies. The core 20 will, of course, require to have sections cut out of it to allow insertion of the foam isolation members 21 which will be coextensive with the core and held in place by the "KEVLAR" strength members 22 and the stocking 23 as well as by the braided conductors 24.

From the foregoing it will be seen that a typical construction is to use a buoyant fibre cable which has a braided construction capable of being loosened to insert the hydrophones and possibly a preamplifier for each hydrophone, or a preamplifier for batches of hydrophones, and possibly other sensors and electric/or electro-optic units for encoding, and to include over this area where the fibre cable has been disturbed cords of "KEVLAR" strength members and supporting construction members.

While the strength members are preferably formed of the material known under the trade name of "KEVLAR" other materials could be used. Any voids in the cable are filled with a buoyant gel by any known method that insures a void-free fill.

It will be realised from the foregoing that the construction according to this invention is highly advantageous with regard to strength and structure generally in that the completed buoyancy cable can be of substantially uniform diameter throughout its length, free from obstructions and configuration which could cause a high noise level when the device is towed through water, the cable being readily coilable for storage purpose on a vessel or the like.

It will be realised of course that while some forms of construction have been outlined above it will be possible to construct the acoustic array in many ways, the basis of the invention being the use of lightweight synthetic materials having a strength such that they can replace the normal steel cables or similar tension devices which because of their weight and characteristic then require to have associated with them substantial buoyancy chambers to reach neutral buoyancy for the array, the preferred materials for this invention being, as said, materials such as polypropylene and that known under the trade name "KEVLAR" which can be stranded successfully and produce the necessary high tensile strength, and the use of a buoyant gel in place of the normally used buoyant liquid such as kerosene, the gel, by its thixotropic property, improving the cable robustness by minimising both loss of buoyant fill and water ingress should the cable become ruptured in use, and the component conductors and synthetic fibres being configured in such a way as to allow the insertion of packages containing sensors, preamplifiers and the like prior to impregnation with the buoyant gel and finally the extrusion of an outer plastic sheath.

I claim:

1. A hydrophone cable having a series of hydrophones at spaced intervals along the cable and having an outer sheath and within it strength members and transmission line conductors extending along the cable, the improvement comprising said cable having a braided construction arranged so that the braided members can be loosened to insert the hydrophone assemblies into said cable, said transmission line conductors being helically wound in one direction and being braided with fiber strands helically wound in the opposite direction, said fiber strands at spaced locations along said cable being cut whereby said transmission line conductors can be twisted open at said spaced locations to receive a hydrophone assembly, a hydrophone assembly inserted within said transmission line conductors at said spaced locations, said outer sheath being extruded and filled with a buouant gel to give buoyance to the cable.

2. A hydrophone cable according to claim 1 wherein the said strength members form a core of the said cable held in place by a braided overlay but extend outwardly to lie over housings containing the said hydrophone assemblies.

3. A hydrophone cable according to claim 1 wherein the said strength members extend along the said cable outside of a central core and are held on to the said core by a braided overlay, and wherein the said core has coextensive foam isolation members inserted in it to house the said hydrophone assemblies.

4. A hydrophone cable according to claim 1 wherein the said hydrophone assemblies are held in an open-cell foam supported in a tubular separator and having end spreaders, and the said cable has a core of strength members carried out and over the said tubular separator but held between the said separators by an overlay of braided members including twisted pair conductors braided with fibre strands, said conductors being also carried out and over the said tubular metal separators.

5. A hydrophone cable according to claim 4 wherein the said separator has longitudinal grooves to accommodate the said strength members and the said conductors.

6. A hydrophone cable according to claim 1 or 4 wherein the said strength members are formed of a material known under the trade mark "KEVLAR" and wherein the said braided members excepting the said conductors are formed of polypropylene.

7. A hydrophone cable according to claim 1 characterised in that the cable is constructed in a continuous length without modular interconnection.

8. A method of forming a hydrophone cable having a series of hydrophones at spaced intervals along the cable and having an outer sheath and within it strength members and transmission line conductors extending along the cable, in which the cable is formed by the steps of braiding, inserting at least sensors by cutting some of the members of the braid other than the transmission line conductors, twisting the cable at the cut area to open the structure to allow insertion of sensors connected to the transmission lines, closing the cable over the sensors, impregnating with a gel to give buoyancy to the cable, and extruding a sheath over the cable, whereby the sensors are positioned at or near the core of the cable.

* * * * *